March 29, 1932.  H. M. HUNT ET AL  1,851,515

REFRIGERATED SHOWCASE

Filed March 12, 1930

Inventors
Howard M. Hunt
Joseph H. Batteiger
By Lyon & Lyon
Attorneys

Patented Mar. 29, 1932

1,851,515

UNITED STATES PATENT OFFICE

HOWARD M. HUNT, OF HUNTINGTON PARK, AND JOSEPH H. BATTEIGER, OF LOS ANGELES, CALIFORNIA, ASSIGNORS TO SMOOT-HOLMAN COMPANY, OF INGLEWOOD, CALIFORNIA, A CORPORATION OF CALIFORNIA

REFRIGERATED SHOWCASE

Application filed March 12, 1930. Serial No. 435,166.

This invention relates to refrigerated show-cases such as are applicable for the displaying and storage of food products including meats, fish, fowl, dairy products, fruit, vegetables and the like and in which showcases low temperatures may be maintained if desired, even to a temperature sufficient to freeze or maintain the food products which have been frozen.

In the use of such a display case great difficulty has been encountered in sealing the interior of such a case from the exterior at the visible portions usually constructed of spaced plates of glass. Great difficulty has also been encountered from the fact that in such structures where spaced glass plates are used, fogging of the plates of glass in the space between the plates occurs.

A very slight leak will permit air to circulate into such spaces and the moisture from this air will condense on the surfaces of the glass. This condensation of water results in fogging of the plates and visibility into the showcases is either impaired or prevented. This fogging also produces the appearance of uncleanliness which is very objectionable in the displaying of food products.

A further difficulty results from the fact that when such spaces are sealed perfectly and the plates of glass are long, in many cases up to twelve feet long and approximately three feet high, a sufficient atmospheric pressure differential is created when shipping the showcases to high and low altitudes, as over mountains and into or through locations below sea level under conditions of temperature changes, that the glass becomes broken by the atmospheric pressure differential between the inside and outside of the plates of glass.

It is therefore an object of our invention to provide a showcase which includes a means of sealing perfectly the spaces between the glass to prevent fogging thereof when in use, and a means for preventing breaking of the plates of glass due to such atmospheric pressure differences.

Another object of this invention is to provide a showcase including a window formed of a plurality of spaced sheets of glass which are so mounted and secured in position and sealed therein as to prevent fogging thereof.

Another object of our invention is to provide a showcase for displaying refrigerated or frozen food products in which there is provided a window section of wide range of visibility extending substantially the entire length and height of the showcase, and including a plurality of spaced plates of glass mounted in and sealed in a continuous rim of ribbed rubber cemented to the edges of the glass plates under pressure, and in which there is provided a means to vent the spaces during shipment thereof, but which vent means may be removed and the structure perfectly sealed.

Other objects and advantages of this invention it is believed will be apparent from the following detailed description of a preferred embodiment thereof as illustrated in the accompanying drawings.

Figure 1:
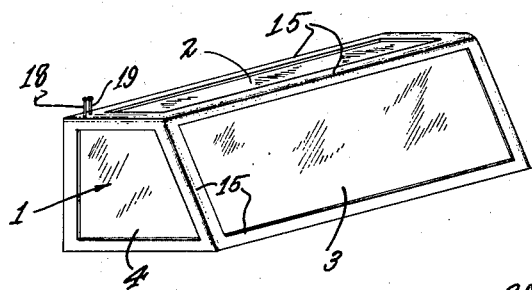
Figure 1 is a perspective view of a showcase embodying our invention.
Figure 2:
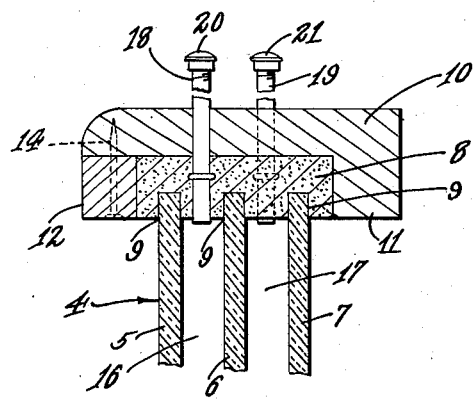
Figure 2 is a fragmental sectional edge view of a window thereof.
Figure 3:
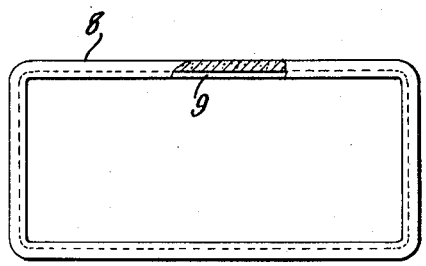
Figure 3 is a detached fragmental view of the pressure sealing rim embodied in our invention.

In the preferred embodiment of our invention illustrated in the accompanying drawings, 1 indicates a refrigerated showcase in which food products are adapted to be displayed. Any suitable or desirable means are provided for reducing the temperature within the showcase to a temperature sufficiently low to maintain the food products refrigerated or frozen, as may be desired.

The showcase 1 is preferably formed with window sections including a front display window 2, a display window 3, and may be provided with end windows 4 if desired. Each of the window sections is of unit construction and has the same structural characteristics except as to dimensions so that only one section display window 2 will be specifically described.

The display window 2 includes three spaced plates of glass, 5, 6 and 7, which are of material length and width, depending on the size of the showcase, and often upwards of twelve feet in length and three feet in height. The three sheets of glass are secured in position and spaced apart by means of a rim 8 of soft rubber, which is grooved as illustrated at 9 to receive the edges of the glass plates.

The rim 8 of rubber is of a lesser perimeter than the perimeter of the sheets of glass. The elasticity of the rim of rubber permits of the stretching of the rubber over the edges of the plates of glass with the edges falling into the grooves 9. The rim may be over a foot less in length than the perimeter of the plates of glass, and is a continuous ring of rubber. When using a soft, vulcanized rubber rim 8, the grooves are treated with a suitable substance, preferably a mixture of alcohol and glycerine, before the rim is stretched over the edges of the glass so that the rubber will be bonded to, and sealed to, the glass plates 5, 6 and 7 at its edges.

When a rim of uncured sealing gum is used, it is unnecessary to use a mixture to cement the rim to the edges of the glass plates, as such uncured sealing gum has a sufficient adhesive property to make the use of such a cementing mixture unnecessary.

After the rim 8 is stretched over the perimeter of the glass plates, the assembly thus formed is placed in a molding 10 which includes an integral rear flange 11. A pressure block 12 is then placed in the channel of the molding against the outer edge of the rim 8 and pressure is applied to the block 12.

The uniform pressure used may vary within a considerable range but is sufficient to insure the adhesion of the rim 8 to the edge of the plates of glass 5, 6 and 7 continuously around the edges and surfaces of the plates of glass. As the block 8 is pressed into place under a material pressure, it is nailed, screwed or otherwise secured in position by means of nails 14 or other fastening means. The windows 2, 3 and 4 thus formed are then secured in position within the rails 15 of the showcase in any suitable or desirable manner.

In order to permit venting of the spaces 16 and 17 between the plates of glass 5, 6 and 7, vent tubes 18 and 19 are passed through the moldings 10 and extending out through the rails 15. The vent tubes 18 and 19 extend through and are sealed in the rubber rim 8 into the spaces 16 and 17. The spaces 16 and 17 preferably remain vented until the showcase is set up at the point of use and are then sealed with caps 20 and 21 which screw-thread to the outwardly extending ends and are sealed thereto by the use of any suitable sealing means such as gum arabic or the like.

In some cases it is desirable to reduce the air pressure within the spaces 16 and 17 as, for example, when the showcase is to be shipped into a location above sea level. It is desirable also to partially vacuumate the spaces 16 and 17 where extremely low temperatures are to be employed as, for example, when the showcase is to be used for the storage and display of frozen foods.

Having fully described our invention, it is to be understood that we do not wish to be limited to the details herein set forth, but our invention is of the full scope of the appended claims.

We claim:

1. In a refrigerated showcase adapted to be reduced in temperature within, including a display section formed of a plurality of plates of glass, a continuous one-piece elastic rim of comparatively soft rubber of lesser perimeter than the perimeter of the plates of glass applied over the edges of the glass plates, said rubber rim having a plurality of continuous grooves of substantially the same width as the width of the panes of glass, a sealing substance applied to the interior of said grooves for sealing the panes of glass in the rubber grooves when pressure has been applied thereto, a molding having a plurality of sides into which the rim is fitted with plates applied thereto, pressure applying members consisting of a plurality of pressure blocks secured to the molding in position to compress portions of the rubber rim against the edge portions of the glass plates and compress other portions of the rubber rim against the sides of the molding to hermetically seal the molding and glass plates by the said rubber rim, said molding having an aperture, and a vent tube anchored and hermetically sealed in said rubber rim, said tube having a portion extending through said aperture to a point on the outside of said showcase and having a removable closure for entirely sealing of the space between said glass plates from the outside atmosphere.

2. In a refrigerated showcase adapted to be reduced in temperature within, including a display section formed of a plurality of plates of glass, a continuous rim of comparatively soft vulcanized rubber of lesser perimeter than the perimeter of the plates of glass applied over the edges of the glass plates, said rubber rim having a plurality of continuous grooves, a molding having a plurality of sides into which the rim is fitted, a pressure block secured to the molding in position to compress portions of the rubber rim against the edge portions of the surfaces of the plates and to compress other portions of the rubber rim against the molding to hermetically seal the molding and glass plates by the said rubber rim, said molding having an aperture, and a vent tube anchored in said rubber rim and having a portion extending through said aperture to a point on the outside of said showcase and having a removable closure attached to said vent tube on the outside of said showcase.

Signed at Los Angeles, Calif., this 7th day of March, 1930.

HOWARD M. HUNT.
JOSEPH H. BATTEIGER.